F. E. KLING.
VALVE.
APPLICATION FILED OCT. 7, 1918.
1,334,248. Patented Mar. 16, 1920.

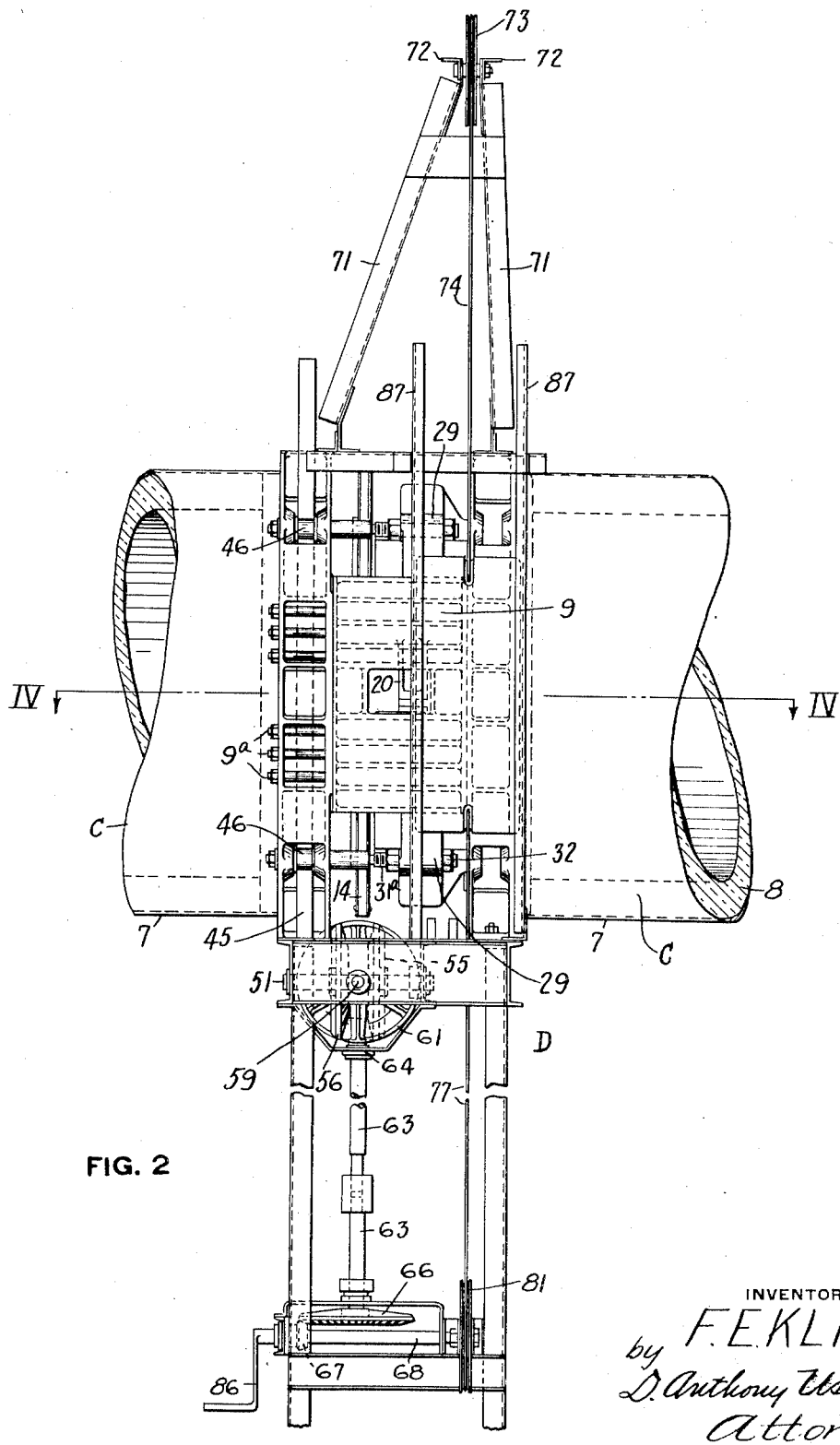

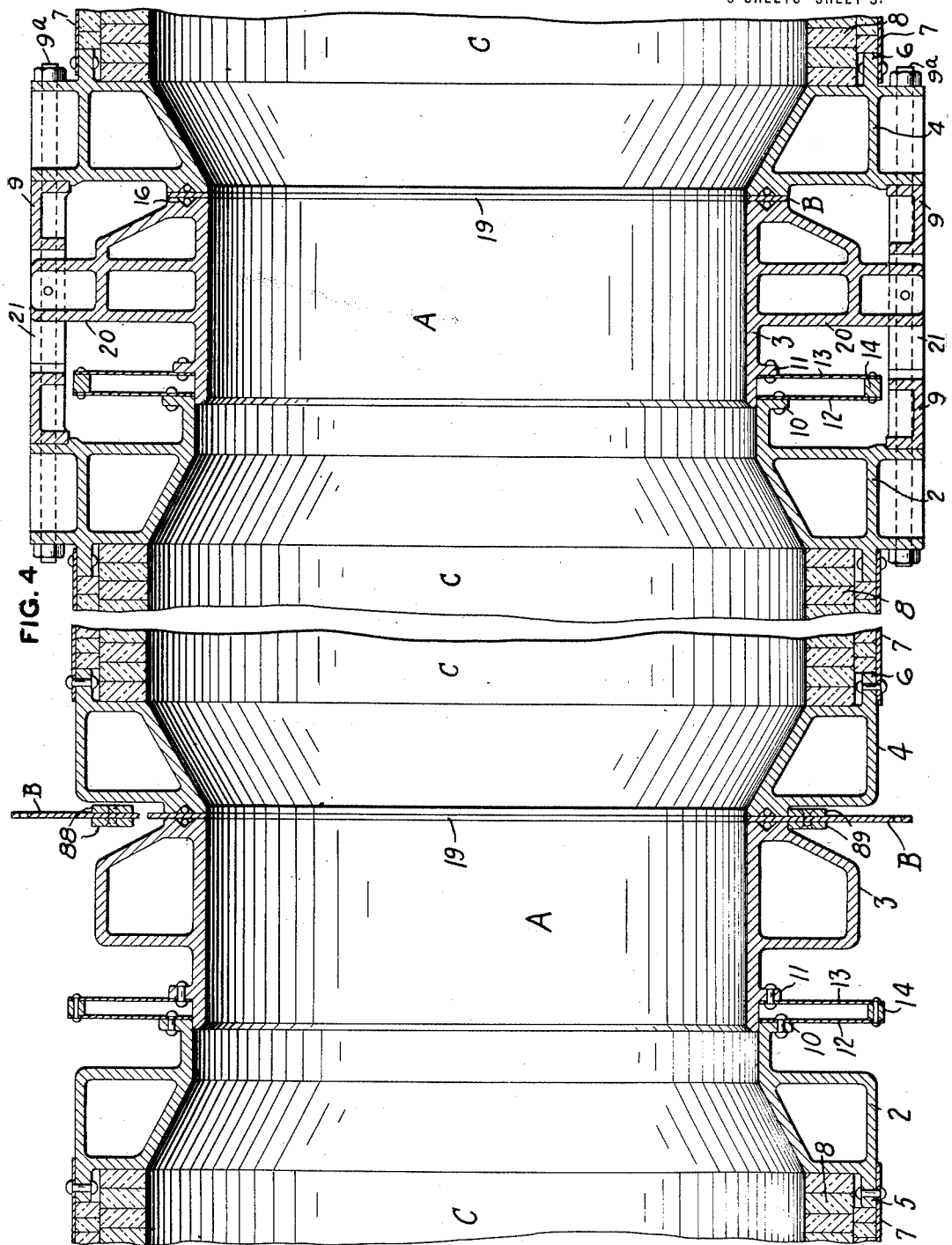

F. E. KLING.
VALVE.
APPLICATION FILED OCT. 7, 1918.

1,334,248.

Patented Mar. 16, 1920.
5 SHEETS—SHEET 4.

INVENTOR
F. E. KLING
by D. Anthony Usina
Attorney

F. E. KLING.
VALVE.
APPLICATION FILED OCT. 7, 1918.

1,334,248.

Patented Mar. 16, 1920.
5 SHEETS—SHEET 5.

INVENTOR
F. E. KLING.
by D. Anthony Usina
Attorney.

UNITED STATES PATENT OFFICE.

FRED E. KLING, OF YOUNGSTOWN, OHIO.

VALVE.

1,334,248.  Specification of Letters Patent.  Patented Mar. 16, 1920.

Application filed October 7, 1918. Serial No. 257,247.

*To all whom it may concern:*

Be it known that I, FRED E. KLING, a citizen of the United States, and resident of Youngstown, in the county of Mahoning and State of Ohio, have invented certain new and useful Improvements in Valves, of which the following is a specification.

My invention relates generally to the construction of valves, and while not limited to such use, more particularly relates to the construction of the valves on the large gas mains or conduits used in handling and conveying the gases evolved in the operation of blast furnaces, gas producers, by-product coke ovens, and the like.

One object of my invention is to provide a strong and durable valve which is self clearing; which has a balanced reciprocatory gate or shutter and is easily opened and closed; and which prevents leakage of gases into the atmosphere and from one side to the other of the gate or shutter when open or closed.

Another object of the invention is the provision of a valve having a sliding gate or shutter and relatively adjustable valve seats coacting with said shutter.

A further object of the invention is to provide a valve having a sliding gate or shutter with relatively adjustable coacting valve seats and having novel means whereby the adjustable valve seats are advanced and retracted in operating the valve.

A still further object of my invention is the provision of a gas valve having the novel constructions, arrangements and combinations of parts shown in the drawings, hereinafter described in detail, and particularly pointed out in the appended claims.

Referring now to the drawings, forming part of this specification, Figure 1 is an end elevation, partly in section, showing a valve embodying the novel features of my invention.

Fig. 2 is a side elevation of the valve of Fig. 1, showing the construction and arrangement of the movable gate or shutter and operating mechanism therefor.

Fig. 3 is a sectional side elevation, on a larger scale, showing details in the construction of the valve body and shutter, the section being taken on the line III—III of Fig. 1.

Fig. 4 is a sectional plan, on a larger scale, showing further details in the construction of the valve of Figs. 1, 2, and 3, the section being taken on the line IV—IV of Fig. 2.

Figure 1:
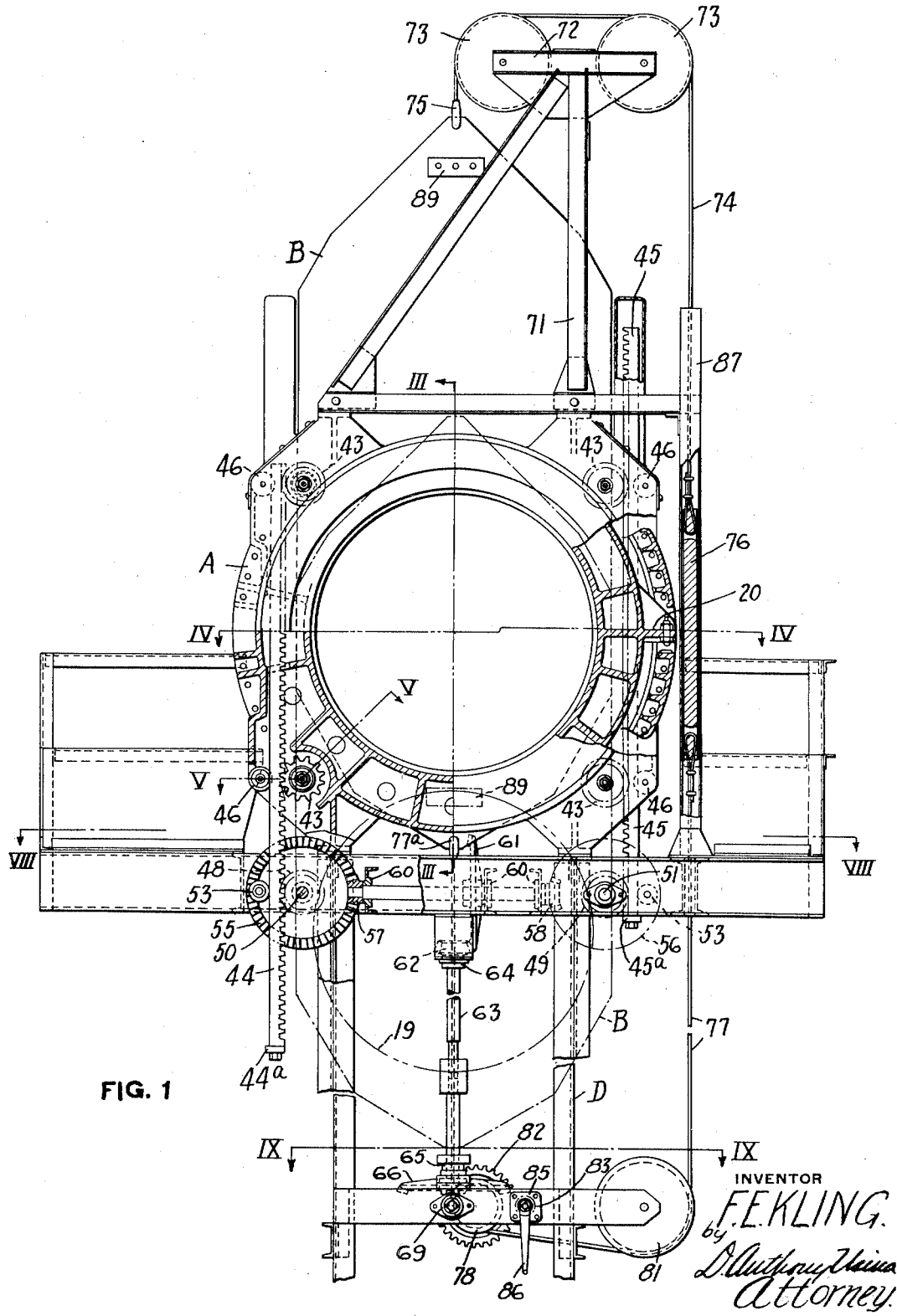

In the accompanying drawings, in a general way, letter A designates the segmental body, and B the sliding gate or shutter, the valve being shown applied for use on a horizontal gas main C and having a supporting framework D.

The valve body A, which is made in sections, comprises transversely divided end segments 2 and 4, and an intermediate segment 3, the segments 2 and 4 having annular flanges 5, 6 on one end thereof by which the valve is rigidly fastened to the metal shell 7 of the gas conduit or main C. The gas main shown, being intended to handle highly heated gases, has a refractory lining 8 to protect the thin metal shell 7 from direct contact with the gases.

The segments 2, 3, and 4 of the body are made of hollow, box cross-section and strongly ribbed so as to combine maximum strength and rigidity with a minimum weight of material and form a valve body which will resist the enormous bending and other strains to which such valves are subjected when in use.

Figure 5:
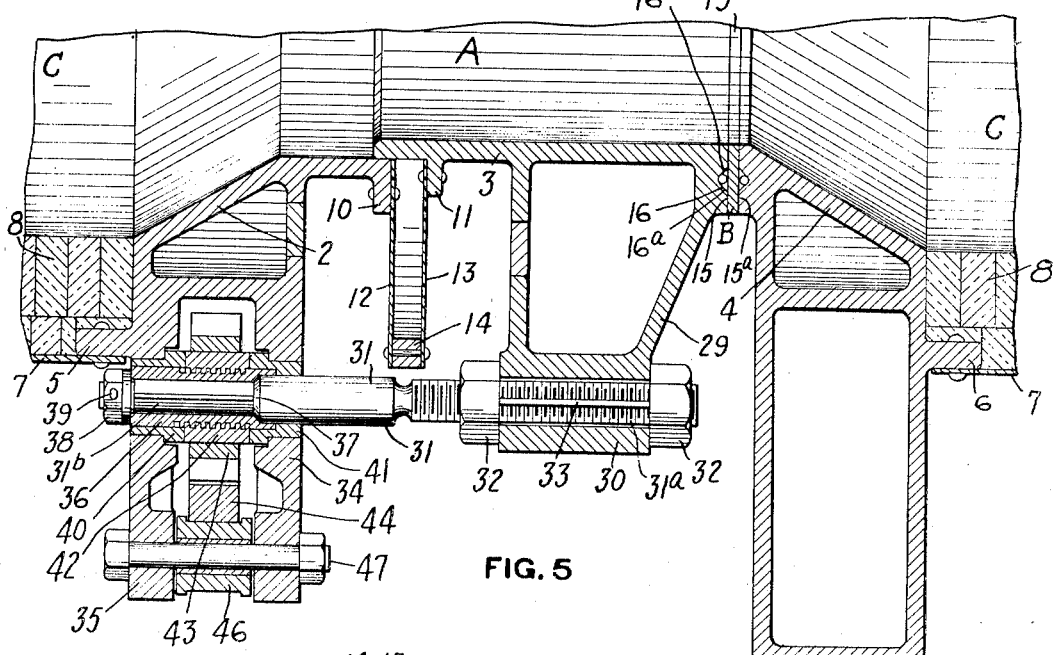
Fig. 5 is a transverse section, on the irregular line V—V of Fig. 1, showing still further details in the construction of the valve and valve operating mechanism.

The end segments or sections 2 and 4 of the valve body are connected together by bolts or threaded tie rods 9ª and distance pieces or separators 9, the separators, of which there is one on each side of the vertical axis of the valve, maintaining the segments 2 and 4 in spaced relation. Between the end segments 2 and 4 is the intermediate segment 3, which is movable relative to the end segments, and one end of the middle segment 3 is in overlapping engagement with the contiguous end of the section 2. (See Figs. 3, 4, and 5).

The overlapped ends of the segments 2 and 3 of the valve body, which are relatively movable, have contiguous peripheral flanges 10 and 11 to which the gas tight expansion joint between the segments 2 and 3 is fastened. This expansion joint is formed of two thin, annular metal plates 12 and 13, and a spacing ring 14 between the plates at the periphery thereof, the plates 12 and 13 being riveted to the spacing ring 14. (See Figs. 3, 4, and 5).

Figure 6:
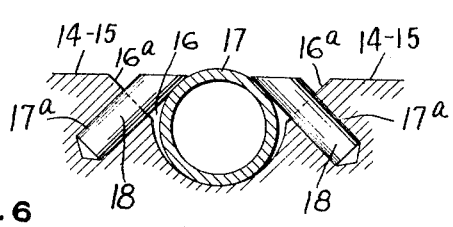
Fig. 6 is a fragmentary section, on a larger scale, showing details in the construction of the improved valve seat forming part of my invention.

The abutting ends of the middle segment 3 and end segment 4 of the valve body have plane faces 15, 15ᵃ, forming seats for the sliding gate or shutter B of the valve. A circular groove 16, which has sloping sides 16ᵃ, 16ᵃ, is provided in each of the faces forming the seats 15, 15ᵃ, and secured in each of the grooves 16, so as to extend slightly beyond the plane faces of the seats 15 and 15ᵃ, and engage with the flat parallel faces of the gate or shutter B in making a tight joint between the seats 15, 15ᵃ, and the flat faces of the gate or shutter B is a hollow elastic ring 17. These rings as shown are conveniently formed of a brass tube bent to form an annulus. The rings 17 are held in place in the grooves 16 by means of a series of pins 18 which are tightly driven into holes 17ᵃ in the angular side surfaces 16ᵃ of the V-shaped slots, the projecting ends of the pins being beveled. (See Fig. 6).

Being elastic, the hollow rings 17 will be tightly pressed against the flat sides of the gate or shutter B when the face 14 of the middle valve body segment 3 is moved toward the face 15 of the segment 4 by the valve seat adjusting mechanism, as is done after each gate raising or lowering operation, in this way leakage of gases through the valve at the joints between the seats 14, 15, and gate or shutter plate B being avoided and overcome.

The valve A is positioned on the horizontal gas main C so that the slidable gate or shutter B will reciprocate vertically, this gate being positioned in the slot or groove formed by the adjacent plane faces 14, 15, of the body sections 3 and 4 of the valve. By constructing the valve body in this manner with an open slot through which the gate or shutter B extends at all times, any finely divided solids or similar impurities collecting in the path of the sliding gate are dislodged thereby when the gate is moved, and caused to pass out of the valve.

The gate or shutter B has a circular opening 19 in the lower end thereof, the diameter of this opening being the same as the internal diameter of the middle section 3 of the valve body, and the opening 19 is put in the lower end of the gate so that when the gate is raised the opening 19 will register with the axial opening in the valve body, and when lowered the opening 19 in the gate and axial opening in the valve body will not register and the gate will entirely prevent passage of gases through the valve and leakage into the atmosphere. The internal diameter of the middle segment 3 of the valve body is somewhat less than that of the lined gas main C so that the velocity of the flowing gases is increased in passing through the segment 3, in this way lessening and preventing the deposition within the valve body of finely divided solids carried in suspension in the gases.

The middle segment 3 of the valve body is provided with feet 20, 20 by which it is slidably supported upon the separators 9 used in rigidly connecting the end segments 2 and 4 of the valve body, the separators 9 having transverse openings 21 therein, and the lower edges of these openings having a plane face 22 forming a sliding surface for the adjustable shoes 23 on the feet 20. (See Figs. 1, 2, 4, and 7).

The shoes 23 have a hemispherical depression 24 in the upper face thereof into which the hemispherical ends of the shoe adjusting bolts 25 project and the bolts 25 project vertically through holes in the feet 20, nuts 26 and lock nuts 27 being provided on the threaded portions of the bolts to adjust and fasten the shoes 23 in adjusted position on the feet 20. The slots 28 in the lower face of the feet 20 are of such width as will prevent rotation of the nuts 26 when the bolts 25 are turned, as is done with a wrench applied to the square upper end of the bolts 25, in adjusting the shoes 23 on the feet 20.

The middle section 3 of the valve body also is provided on its periphery at four equi-distant points with integral arms 29, each arm projecting outwardly and having a boss 30 on the outer end thereof, and secured in the openings in each of these bosses are screw-shafts 31. The end 31ᵃ of the shafts 31 projecting through the bosses is screw threaded and nuts 32, 32 on opposite ends of the screw threaded portions of the shafts 31 provide for longitudinal adjustment of the shafts on the arms 29. A spline 33 prevents rotation of the shafts 31 in the holes in the bosses 30. The other end 31ᵇ of the screw-shafts which is of reduced size and square cross-section projects through registering openings in the parallel lugs or flanges 34, 35, provided for that purpose on the end segment 2 of the valve body (see Figs. 1, 2, and 5) and secured on the squared portion of the shafts 31, is a removable sleeve 36 which is screw-threaded on its periphery. The sleeves 36 have a longitudinal opening therein of rectangular cross-section fitting the squared portion 31$^b$ of the screw-shafts, and the sleeves 36 are held in position against the shoulder 37 on the shafts 31 by nuts 38 on the threaded outer end of the shafts, and cotter-pins 39, which extend through registering holes in the nuts 38 and shaft ends.

The registering openings in the flanges 34, 35 of the segment 2 of the valve body have bushings 40, 41 therein forming bearings for the sleeves 36 which move lengthwise in the bushings, and mounted on each sleeve 36 between the adjacent ends of the bushings 40, 41 is an internally threaded nut 42 having a spur pinion 43 keyed or otherwise fastened on the periphery thereof. Obviously the nut 42 may be omitted and the axial opening in the pinions 43 may be lessened in diameter and provided with internal threads when found necessary or desirable.

Figure 9:
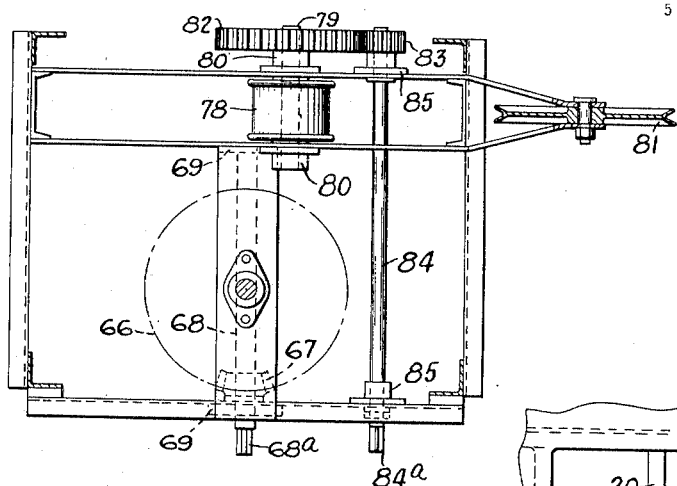
Fig. 9 is a sectional plan, on the line IX—IX of Fig. 1, showing further details in the construction of the valve operating mechanism and supporting framework.
Figure 7:
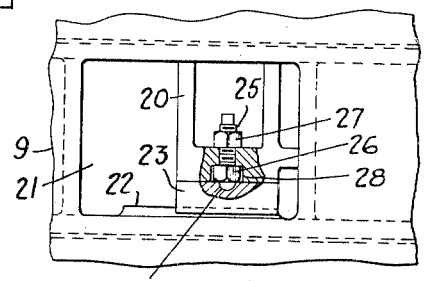
Fig. 7 is a fragmentary elevation, partly in section, showing details in the construction of the sliding support for the adjustable middle segment of the sectional valve body.
Figure 8:
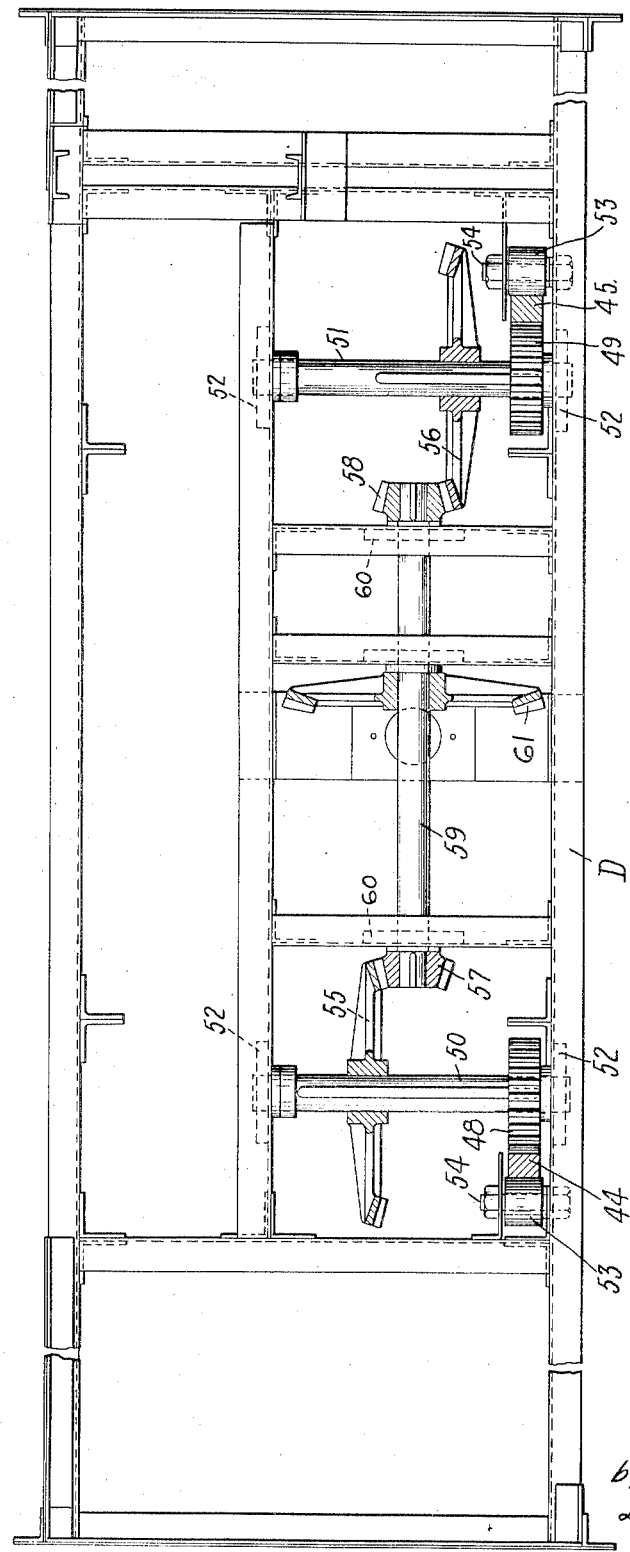
Fig. 8 is a sectional plan, on the line VIII—VIII of Fig. 1, showing details in the construction of the valve operating mechanism and supporting framework.

Meshing with the two pinions 43 forming one of the two pairs of pinions, is a rack 44 which is arranged to reciprocate vertically, and a similar rack 45 meshes with the other pair of the pinions 43. The teeth of the racks are maintained in operative engagement with the teeth of the pinions 43 by means of the flanged rollers 46 which are rotatably mounted on bolts 47 extending through registering openings in the flanges 34, 35 on the segment 2 of the valve body. (See Figs. 1, 2, 6, and 8). The rack 44 on one side of the valve is arranged to move upwardly when the rack 45 on the other side moves downwardly and vice-versa, this construction avoiding the necessity of making right and left hand threads on the sleeves 36 and nuts 42. Each of the racks extends downwardly far enough to always maintain its teeth into mesh with the teeth of the rack actuating spur gears 48, 49, which are fastened on horizontal shafts 50, 51 mounted in the bearings 52, 52 on the supporting framework D for the valve and valve operating mechanism. Stops 44$^a$ and 45$^a$ are provided in the lower end of the racks 44, 45 to limit the lifting movement thereof. (See Figs. 1 and 8). Anti-friction rollers 53, 53, rotatably mounted on pins or bolts 54 secured on the supporting frame maintain the teeth of the racks 44, 45, in mesh with the teeth of the spur gears 48 and 49. The shafts 50 and 51 for the spur gears 48 and 49 have bevel gears 55 and 56 thereon which mesh with bevel pinions 57, 58 on the opposite ends of a horizontal shaft 59 which is mounted in bearings 60, 60 on the supporting frame. It will be seen by reference to Fig. 8 that the gears 55 and 56 are mounted on the shafts 50 and 51 in such manner relative to the bevel pinions 57 and 58 that when the shaft 59 is turned the shafts 50 and 51 both rotate in the same direction, and in this way cause the spur gears 48 and 49 to always move the racks 44 and 45 in opposite directions. The gear shaft 59 is also provided at an intermediate point in its length with a bevel gear 61 which meshes with a bevel pinion 62 on the upper end of the vertical shaft 63, the shaft 63 being operatively mounted in bearings 64, 65 on the supporting frame D. The lower end of this vertical shaft 63, which is made in sections, has a bevel gear 66 thereon which meshes with a bevel pinion 67 on the crank shaft 68 by which the valve seat adjusting mechanism is actuated. This crank shaft 68 is mounted in bearings 69, 69 on the supporting frame D, and one end 68$^a$ of the shaft which is squared for a crank which is removably applied on the squared portion 68$^a$ thereof. (See Figs. 1, 2, and 9).

The supporting framework at the upper part of the valve also is provided with substantially vertical posts 71, which are suitably braced and have a horizontal cross-arm 72 rigidly secured to the upper end thereof. Mounted on the opposite ends of the cross-arm 72 are idler pulleys or sheave wheels 73, 73, and extending around these sheave wheels is a cable or other flexible connection 74 for raising and lowereing the gate or shutter B of the valve. One end of the flexible connection 74 is secured by a clevis 75 to the upper end of the sliding gate or shutter B, and the other end thereof is fastened to the upper end of the counter-weight 76 by which the gate B is counterbalanced. (See Figs. 1 and 2.) The lower end of the sliding gate B also is connected by means of a clevis 77$^a$ to one end of a cable or other flexible connection 77 which is wrapped a number of times around the drum 78 on the horizontal shaft 79 which is mounted in bearings 80, 80 on the lower end of the supporting framework. (See Fig. 9). The cable 77 after being wound around the drum 78 and passing around the pulley 81 on the lower end of the framework extends upwardly and is fastened to the lower end of the counter-weight 76. (See Figs. 1, 2, and 9). The drum 78 is connected by reducing gears 82, 83 to the horizontal crank-shaft 84 mounted in bearings 85, 85, on the lower end of the valve supporting framework, and one overhanging end 84$^a$ of this crank-shaft 84 is squared to receive a removable crank 86 by which the drum is manually operated in raising and lowering the gate or shutter B in moving it into open and closing position.

The counter-weight 76 which is rectangular in cross-section, is of considerable length and width and small thickness, and channel beams 87, 87 fastened to the framework are arranged to extend vertically with their flanges in sliding engagement with the vertically extending longitudinal edges defining the width of the counter-weight, so as to form guides for the vertically movable counter-weight. (See Figs. 1 and 2). Stops 88 and 89 on opposite ends thereof (see Fig. 3) serve to limit the vertical movement of the sliding gate or shutter B. The part of the framework D which supports the valve seat adjusting mechanism, is extended horizontally, on opposite sides of the valve body, to form a platform from which the workmen may conveniently work around the valve, the valve as shown being applied to an overhead gas main.

The operation of my improved valve, which will be readily understood, will now be described. The parts will be assembled in the manner shown, with the balanced gate or shutter B suspended between the contiguous faces 14, 15 of the valve body segments 3 and 4. In assembling the valve the screw-shafts 31 will be adjusted in the holes in the bosses 30 on the arms 29 to make the faces or seats 14 and 15 parallel and at such distance apart that when they are moved into open or retracted position, the shutter B will be free to move vertically between the elastic rings 17 in the grooves 16 of the faces or seats 14 and 15.

The middle segment 3 of the valve body also will be adjusted, by turning the adjusting bolts 25 for the shoes 23, to bring this segment into axial alinement with the gas main C and insure the major portion of the weight of the segment 3 is supported on the pads 22 of the separators 9.

The valve, as shown, being open, the gate or shutter B is in raised position, with the hole 19 in the shutter in alinement with the axes of the valve body A and horizontal gas main C. The crank 86 is then applied to the squared end 68ª of the shaft 68 and turned manually. When the shaft 68 is rotated clockwise by the crank the connecting gearing moves the rack 44 downwardly and rack 45 upwardly so as to turn the nuts 42 in a counter-clockwise direction on the screw-shafts 31. The movement of the nuts causes the screw-shafts 31 to advance the face or seat 14 of the middle segment 3 toward the seat 15 on the segment 4 of the valve body, and tighten the packing rings 17, 17 in the grooves 16 of the valve seats 14, 15 against the parallel faces of the shutter or gate B. When tightened in this manner leakage from the interior of the valve into the atmosphere is effectually prevented.

When the valve is to be closed, the crank shaft 68 will be turned manually to move the nuts 42 in a clockwise direction and thereby retract the seat 14 of the valve body segment 4 and release the shutter B. After the shutter is freed the crank shaft 84 is turned to rotate the rope drum 78 in a counter-clockwise direction, which lowers the counter-balanced shutter B into the position shown by broken lines in Fig. 1. When in this position the shutter cuts off the flow of gases through the valve. After the shutter is lowered the operating mechanism is again actuated to turn the nuts 42 on the screw-shafts 31 and move the shafts 31 and face or seat 14 of the adjustable middle segment 3 of the valve body until the rings 17 are again in engagement with the face of the shutter B. When again tightly forced into such engagement, the valve will be closed and leakage from the exterior of the valve into the interior of the valve will be entirely overcome and avoided. Whenever the valve is again opened and closed the above described operations are repeated.

The advantages of my invention will be apparent to those skilled in the art. The apparatus is simple, will not require frequent or costly repairs, and will remain indefinitely in readiness for opening or closing.

Many modifications, which will suggest themselves, in the construction and arrangement of the parts forming my improved valve may be made without departing from the invention defined in the appended claims.

I claim:—

1. A valve comprising a body having an axial opening and having a transverse slot therein, a sliding gate or shutter in the slot, the opposite sides of said slot forming seats engaging with the side surfaces of said shutter, means for moving at least one seat relative to the ends of the valve body in moving said seats into and out of engagement with said shutter, and means for moving said sliding shutter within said slot, in opening and closing the valve.

2. A valve comprising a body made in sections and having an axial opening and a transverse slot therein, the end sections of said body being rigidly fastened together, a gate or shutter extending through said slot, the opposite sides of said slot forming seats engaging with the side surfaces of said shutter, means for moving at least one seat relative to the ends of said valve body to move said seats into and out of engagement with said shutter, and means for moving the shutter within said slot in opening and closing the valve.

3. A valve comprising a body having an axial opening and having a transverse slot therein, a gate or shutter extending through said slot, the opposite sides of said slot forming seats engaging with the side surfaces of said shutter, means for relatively adjusting said seats to vary the width of said slot, means for moving at least one seat relative to the ends of the valve body in moving said seats into and out of engagement with said shutter, and means for moving the shutter within said slot in opening and closing the valve.

4. A valve comprising a body having rigidly connected end sections, said body having an axial opening and having a transverse slot therein, a gate or shutter extending through said slot, said shutter having a transverse hole or eye therein, means for moving the sides of the slot relative to the ends of the valve body in moving said sides into and out of engagement with said shutter, and means for moving the shutter within said slot to shift the eye thereof into and out of alinement with the axial opening in said body in opening and closing said valve.

5. A valve comprising a sectional body having an axial opening therein, said body having rigidly connected end segments and a relatively adjustable middle segment, an expansible fluid tight joint between the contiguous ends of one end segment and the middle segment, the contiguous ends of said middle segment and other end segment forming a transverse slot in the valve body, a shutter slidably mounted in said slot for opening and closing the valve, means for moving the shutter within the slot to open and close the valve, and means for moving the opposite faces of the slot toward and away from the side surfaces of the shutter in operating the valve.

6. A valve comprising a sectional body having an axial opening therein, said body having rigidly connected end segments and a relatively adjustable middle segment, an expansible fluid tight joint between the contiguous ends of one end segment and the middle segment, the contiguous ends of said middle segment and other end segment forming a transverse slot in the valve body, a balanced shutter slidably mounted in said slot for opening and closing the valve, means for moving the shutter within the slot to open and close the valve, and means for moving the opposite faces of the slot toward and away from the side surfaces of the shutter in operating the valve.

7. A valve comprising a transversely divided sectional body having end segments and a relatively adjustable middle segment, means for rigidly connecting said end segments, an expansion joint connecting the adjacent ends of the middle and one end segment, relatively movable valve seats formed by the adjacent ends of the middle segment and the other end segment, a shutter or gate movable between said valve seats, means for moving the shutter between said seats to open and close the valve, and means for moving the valve seats into and out of engagement with the opposite faces of said shutter.

8. A valve comprising a transversely divided sectional body having end segments and a relatively adjustable middle segment, means for rigidly connecting said end segments, an expansion joint connecting the adjacent ends of the middle and one end segment, relatively movable valve seats formed by the adjacent ends of the middle segment and the other end segment, a shutter or gate movable between said valve seats, means for moving the shutter between said seats to open and close the valve, means for relatively adjusting said middle segment relative to the end segments to aline the opposite faces thereof forming the valve seats, and means for moving the alined valve seats into and out of engagement with the opposite faces of said shutter.

9. A valve comprising a transversely divided sectional body having an axial opening, said body having end segments and a relatively adjustable middle segment, means for rigidly connecting said end segments, an expansion joint connecting the adjacent ends of the middle and one end segment, valve seats formed by the adjacent ends of the middle segment and the other end segment, a shutter or gate movable between said valve seats, means for positively moving the shutter between said seats to open and close the valve, and means for moving the valve seats into and out of engagement with the opposite faces of said shutter.

10. A valve comprising a transversely divided sectional body having an axial opening, said body having end segments and a relatively adjustable middle segment, means for rigidly connecting said end segments, an expansion joint connecting the adjacent ends of the middle and one end segment, valve seats formed by the adjacent ends of the middle segment and the other end segment, a shutter or gate movable between said valve seats, means for positively moving the shutter between said seats to open and close the valve, adjusting means for alining said valve seats, and means for moving the valve seats into and out of engagement with the opposite faces of said shutter.

11. A valve comprising a transversely divided sectional body having an axial opening, said body having end segments and a relatively adjustable middle segment, means for rigidly connecting said end segments, an expansion joint connecting the adjacent ends of the middle and one end segment, valve seats formed by the adjacent ends of the middle segment and the other end segment, a shutter or gate movable between said valve seats, means for positively moving the shutter between said seats to open and close the valve, means for moving the valve seats into and out of engagement with the opposite faces of said shutter, and means for slidably supporting the relatively adjustable middle segment on rigidly connected end segments of the valve body.

12. A valve comprising a transversely divided sectional body having an axial opening, said body having end segments and an expansible middle segment, means for rigidly connecting said end segments, valve seats formed by the adjacent ends of the middle segment and one end segment, a shutter or gate between said valve seats, means for reciprocating the shutter between said seats in opening and closing the valve, means for expanding the said middle segment to move the valve seats into engagement with the opposite faces of said shutter in opening the valve, means for slidably supporting the relatively adjustable middle segment on the rigidly connected end segments of the valve body, and means for adjusting the middle segment relative to the end segments to axially aline the segments.

13. A valve comprising a transversely divided sectional body having an axial opening, said body having end segments and an expansible middle segment, means for rigidly connecting said end segments, valve seats formed by the adjacent ends of the middle segment and one end segment, a shutter or gate between said valve seats, means for reciprocating the shutter between said seats in opening and closing the valve, means for expanding the said middle segment to move the valve seats into engagement with the opposite faces of said shutter in opening the valve, and means for moving the middle segment to vary the width of the slot formed by said valve seats.

14. A valve comprising a transversely divided segmental body, said body having end segments and an expansible intermediate segment, the contiguous faces of one end segment and the intermediate segment being separated to form a transverse slot, a gate or shutter within said slot adapted to move into and out of valve closing position, means for actuating said shutter, and means for moving the expansible segment to bring the faces forming said slot into and out of engagement with said shutter.

15. A valve comprising a transversely divided segmental body, said body having end segments and an expansible intermediate segment, said segments having axial openings therein, the contiguous faces of one end segment and the intermediate segment being separated to form a transverse slot, means for supporting the expansible segment upon the end segments in axial alinement therewith, a gate or shutter within said slot adapted to move into and out of valve closing position, means for actuating said shutter, and means for moving the expansible segment to bring the faces forming said slot into and out of engagement with said shutter.

16. A valve comprising a transversely divided segmental body, said body having end segments and an expansible intermediate segment, said segments being of hollow box section, the contiguous faces of one end segment and the intermediate segment being separated to form a transverse slot, a gate or shutter within said slot adapted to move into and out of valve closing position, means for actuating said shutter, and means for moving the expansible segment to bring the faces forming said slot into and out of engagement with said shutter.

17. A valve comprising a transversely divided segmental body, said body having end segments and an expansible intermediate segment, the contiguous faces of one end segment and the intermediate segment being separated to form a transverse slot, a gate or shutter within said slot adapted to move therein into and out of valve closing position, means for actuating said shutter and means for moving the expansible segment to bring the faces forming said slot into and out of engagement with said shutter, said means including coacting screw-shafts and nuts, and coacting racks and pinions for simultaneously actuating said shafts, and reducing gears for simultaneously moving said racks.

18. A valve comprising a transversely divided segmental body, said body having end segments and an expansible intermediate segment, the contiguous faces of one end segment and the intermediate segment being separated to form a transverse slot, a gate or shutter within said slot adapted to move into and out of valve closing position, means for actuating said shutter and means for moving the expansible segment to bring the faces forming said slot into and out of engagement with said shutter, said means including coacting screw-shafts and nuts and coacting racks and pinions for simultaneously actuating said shafts, reducing gears for simultaneously moving said racks and a crank for manually actuating said reducing gears.

19. A valve comprising an expansible valve body having an axial opening therethrough, said body having rigidly connected ends, parallel valve seats in said body, a slidable gate coacting with said seats, means for reciprocating said gate between said seats, and means for expanding and contracting said body to move the said seats into clamping engagement with said gate.

20. A valve comprising an expansible valve body having an axial opening therethrough, said body having rigidly connected ends, parallel valve seats in said body, grooves in said seats and a hollow elastic ring forming a gasket in said grooves, a slidable gate coacting with said seats, means for reciprocating said gate between said seats, and means for expanding and contracting said body to move the said seats into clamping engagement with said gate.

21. A valve comprising an expansible valve body having an axial opening therethrough, said body having rigidly connected ends, a transverse slot in said body, a slidable gate extending through the slot, means for reciprocating said gate in said slot, and means for expanding and contracting said body to move the opposite faces of the slot into and out of clamping engagement with said gate.

22. A valve comprising an expansible valve body having an axial opening therethrough, said body having rigidly connected ends, a transverse slot in said body, a slidable gate extending through the slot, said gate having a transverse hole forming an eye therein, means for reciprocating said gate in the slot to move said eye into and out of alinement with the axial opening in said valve body, and means for expanding and contracting said body to move the opposite faces of said slot into and out of clamping engagement with said gate.

In testimony whereof I have hereunto set my hand.

FRED E. KLING.